United States Patent [19]

Moir

[11] 4,176,147

[45] Nov. 27, 1979

[54] PLASTICIZED POLYVINYL CHLORIDE BLANKS AND CARTONS

[75] Inventor: David Moir, Woodcliff Lake, N.J.

[73] Assignee: Alford Industries, Inc., Ridgefield Park, N.J.

[21] Appl. No.: 898,537

[22] Filed: Apr. 21, 1978

[51] Int. Cl.² .................. H05B 3/00; B31B 15/00
[52] U.S. Cl. .................................. 264/25; 93/54.2; 264/138; 264/320
[58] Field of Search .......................... 264/25, 138

[56] References Cited

U.S. PATENT DOCUMENTS

| | | | |
|---|---|---|---|
| 2,975,152 | 5/1961 | Hurwitz et al. | 260/31.6 |
| 3,875,069 | 3/1975 | Worschech et al. | 260/31.6 |
| 3,988,330 | 2/1976 | Foulks, Jr. et al. | 260/31.2 R |
| 4,064,206 | 12/1977 | Seufert | 264/22 |

FOREIGN PATENT DOCUMENTS

| | | | |
|---|---|---|---|
| 1111370 | 7/1961 | Fed. Rep. of Germany | 264/25 |
| 2164085 | 7/1973 | Fed. Rep. of Germany | 264/25 |

*Primary Examiner*—Joseph L. Schofer
*Assistant Examiner*—Peter F. Kulkosky
*Attorney, Agent, or Firm*—Leon E. Tenenbaum

[57] ABSTRACT

A process is provided for preparing blanks and cartons of rigid polyvinyl chloride in which process the formation of the scores and the cutting of the blanks are accomplished simultaneously. The invention also provides a modified polyvinyl chloride for use in the process.

4 Claims, No Drawings

PLASTICIZED POLYVINYL CHLORIDE BLANKS AND CARTONS

BACKGROUND OF INVENTION

This invention relates to the art of forming scores (fold lines) and die-cutting in a simultaneous press operation of rigid polyvinyl chloride (hereinafter referred to as PVC) sheets or rolls. It particularly relates to a process for the manufacture of PVC blanks or cartons and to an improved PVC for use in said process.

At present, numerous processes for scoring or diecutting of rigid PVC cartons or blanks are employed. However, these processes are not geared to high speed production. Additionally, these presently used processes have proven very costly because of the need of expensive equipment and the time required in operation. The presently used processes also require special manufacturing equipment, which can only be used for the manufacturing of PVC cartons and are not suitable for the production of other type cartons such as, for example, paper board cartons.

The presently available processes use commercially available PVC in the form of sheets or rolls. While such PVC is useful in preparing blanks or cartons in such processes as are described, for example, in U.S. Pat. Nos. 3,907,193 and 4,064,206, this PVC is not suitable for use in the process of the present invention. In particular, such PVC when used in the presently available processes requires heating at high temperatures (250°–375° F.) over relatively long periods of time.

OBJECTS OF INVENTION

It is accordingly an object of the present invention to provide a process for the manufacture of PVC blanks or cartons which can be carried at a faster rate than that of the presently available processes.

It is another object of the present invention to provide a process for the manufacture of PVC blanks or cartons in which the formation of scores and cutting are carried out simultaneously.

It is a further object of the present invention to provide a process for the manufacture of PVC blanks or cartons, which can be carried out on equipment available for preparing paper board blanks or cartons.

It is still another object of the present invention to provide a process for the manufacturer of PVC blanks or cartons, which requires a minimal amount of heating of the PVC during the manufacture.

It is still another object of the present invention to provide PVC blanks or cartons which can be readily used in filling and cartoning operations.

It is still another object of the present invention to provide an improved PVC composition which is useful in the process of the present invention.

Other objects of the invention will appear from the description which follows.

In accordance with the present invention there is provided an improved PVC composition which has been found particularly useful in the new process. This composition comprises a PVC which contains from about 1 to 10 parts of a plasticizer to 100 parts of PVC. Preferably, the improved PVC contains about 2 parts per hundred of plasticizer. Suitable plasticizers are aliphatic esters of long chain alcohols or glycols, wherein the alcohols, glycols and acids have from about 6 to 20 carbon atoms. The preferred plasticizer is the bis - (2-ethylhexanoic acid) ester of tetraethylene glycol.

In the process of the present invention a sheet or roll of the plasticized PVC, as described above, is passed beneath a bank of infra-red lamps which raise the temperature of the sheets to about 130–160° F. The contact time with the lamps is about six (6) seconds. Preferably, the focal distance of the lamps is about six (6) inches. The heated moving sheet then enters a reciprocating platen style cutting and scoring press which simultaneously forms the scores and cuts the blanks. Preferably, the plasticized sheet will have a thickness of about 0.006 to 0.020 inches. For sheets of this thickness, pressures of about 50–100 psi suffice to produce the optimum scores or fold lines. Such presses are commercially available in different sizes. A suitable press for practicing the process of the present invention is Model #SP 1260 E, size 36" by 49", obtainable from Bobst Machine Works, Lucerne, Switzerland. The blanks are delivered in the desired alignment after leaving the press and are now ready for gluing and filling.

By using the process of the present invention, the pass time of the process is about 2,000 impression per hour, which time is about thrice the impressions per hour obtained when using the presently available processes. Furthermore, these presently available processes require considerably more heat (250°–375° F.) or a high frequency radiation in addition to the heat. Unlike these prior art processes which require heating of the scoring and/or cutting blades, no such heating is required in the process of the present invention. The process of the present invention thus results in a considerable saving in energy.

The prior art processes also require modification of presently available presses or the provision of entirely new presses to provide for the pressure of heating units.

In the prior art processes the score or fold lines tend to develop discolorations on slight deformations. No such discolorations have been observed in the score or fold lines of the blanks produced by the process of the present invention.

I claim:

1. A continuous process for preparing blanks of a plasticized polyvinyl chloride, said plasticized polyvinyl chloride comprising 1 to 10 parts of a plasticizer per 100 parts of polyvinyl chloride, said plasticizer being an aliphatic acid ester of an alcohol or a glycol wherein each of the acid, alcohol and glycol moreties contains from 6 to 20 carbon atoms, which comprises the steps:
   (a) passing a sheet or roll of the plasticized poly-vinyl chloride under infra-red light to raise the temperature of the sheet to about 130° to 160° F.,
   (b) passing the heated sheet into a reciprocating action creaser and die cutter, and
   (c) simultaneously scoring and cutting blanks.

2. A process according to claim 1, wherein the pass time under the infra-red light is about six (6) seconds.

3. A process according to claim 1, wherein the plasticized polyvinyl chloride sheet has a thickness of about 0.006 to 0.020 inches.

4. A process according to claim 1, wherein the scoring and cutting knives are at ambient temperature.

* * * * *